(12) United States Patent
Chi

(10) Patent No.: US 6,357,838 B1  
(45) Date of Patent: Mar. 19, 2002

(54) MECHANICAL OIL PRESSURE CONTROL APPARATUS FOR ANTILOCK BRAKE SYSTEM

(76) Inventor: Dong Ik Chi, 557-5, Sinsa-Dong, Kangnam-Ku, Seoul, 135-120 (KR)

( * ) Notice: Subject to any disclaimer, the term of this patent is extended or adjusted under 35 U.S.C. 154(b) by 89 days.

(21) Appl. No.: 09/591,725

(22) Filed: Jun. 12, 2000

(30) Foreign Application Priority Data

Mar. 6, 2000 (KR) ........................................ 2000-11021

(51) Int. Cl.$^7$ ................................................. B60T 8/40
(52) U.S. Cl. .................. 303/116.2; 303/11; 137/505.13
(58) Field of Search .................. 303/84.2, 119.2, 303/9.65, 151, 22.5, 116.2, 11, 59; 137/505.13, 517

(56) References Cited

U.S. PATENT DOCUMENTS

| | | | |
|---|---|---|---|
| 2,824,573 A | * 2/1958 | Mason et al. | 137/505.13 |
| 3,375,852 A | * 4/1968 | Milster | 137/493.3 |
| 3,385,637 A | * 5/1968 | Kersting | 303/6 |
| 3,473,849 A | * 10/1969 | Smith et al. | 303/6 |
| 3,514,152 A | * 5/1970 | Erlebach et al. | 303/116.2 |
| 3,526,437 A | * 9/1970 | Lewis | 303/6 |
| 3,547,498 A | * 12/1970 | Bueler | 303/6 |
| 3,608,984 A | * 9/1971 | Skoyles | 303/116.2 |
| 3,677,605 A | * 7/1972 | Matsumoto et al. | 303/6 C |
| 3,706,477 A | * 12/1972 | Stelzer | 303/6 |
| 3,719,401 A | * 3/1973 | Peruglia | 303/116.2 |
| 4,191,210 A | * 3/1980 | Belart et al. | 137/505.13 |
| 4,258,958 A | * 3/1981 | Bloxham | 303/6 |
| 4,407,549 A | * 10/1983 | Klein | 303/6 |
| 4,585,280 A | * 4/1986 | Leiber | 303/100 |
| 4,881,784 A | * 11/1989 | Leppek | 303/100 |
| 4,971,402 A | * 11/1990 | Chen | 303/113 |
| 5,618,086 A | * 4/1997 | Reuter | 303/119.2 |
| 5,855,417 A | * 1/1999 | Johnston et al. | 303/3 |
| 5,983,637 A | * 11/1999 | Lubbers et al. | 60/549 |

* cited by examiner

*Primary Examiner*—Matthew C. Graham  
*Assistant Examiner*—Benjamin A Pezzlo  
(74) *Attorney, Agent, or Firm*—Madson & Metcalf

(57) ABSTRACT

A mechanical oil pressure control apparatus for an antilock brake system including a recessed first body having an oil inlet passage communicating with a master cylinder and an oil outlet passage communicating with a wheel cylinder, a hollow second body threadedly coupled to a front end of the first body, a cylinder member sealably inserted into the first body to define an oil chamber communicating with the oil inlet and outlet passages, a piston slidably fitted in the cylinder member while being subjected to an oil pressure supplied from the master cylinder and exerted in the oil chamber in such a fashion that it slides axially in the oil chamber between a front position where the oil chamber is allowed to communicate with both the oil inlet and outlet passages and a rear position where the communication of the oil chamber with the oil outlet passage is cut off, a compression coil spring received in the second body and adapted to always urge the piston toward the front position against the oil pressure exerted in the oil chamber; and a spring force adjusting bolt threadedly fitted in the second body and adapted to adjust a spring force of the compression coil spring. The spring force is adjusted such that the oil pressure at the point of time established when the piston reaches the rear position substantially corresponds to a brake lock point of the antilock brake system.

4 Claims, 3 Drawing Sheets

[FIG 1]
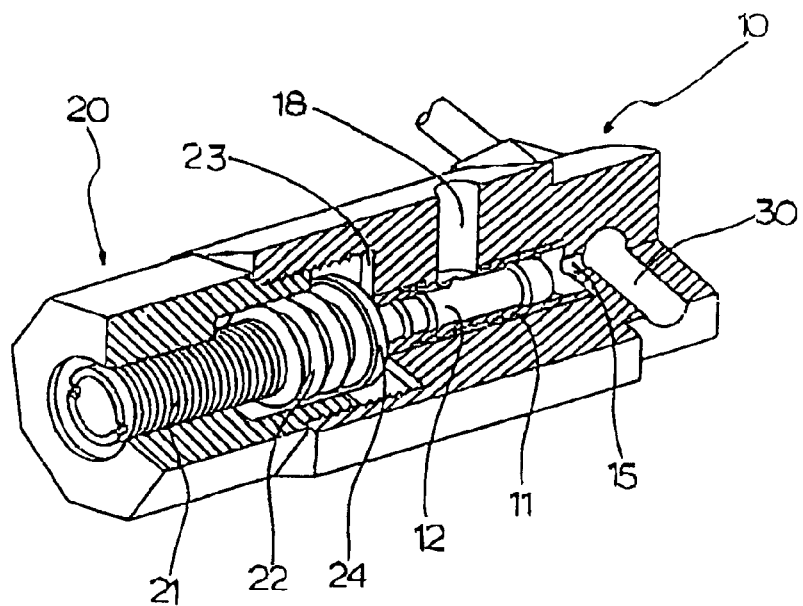
[FIG 2]
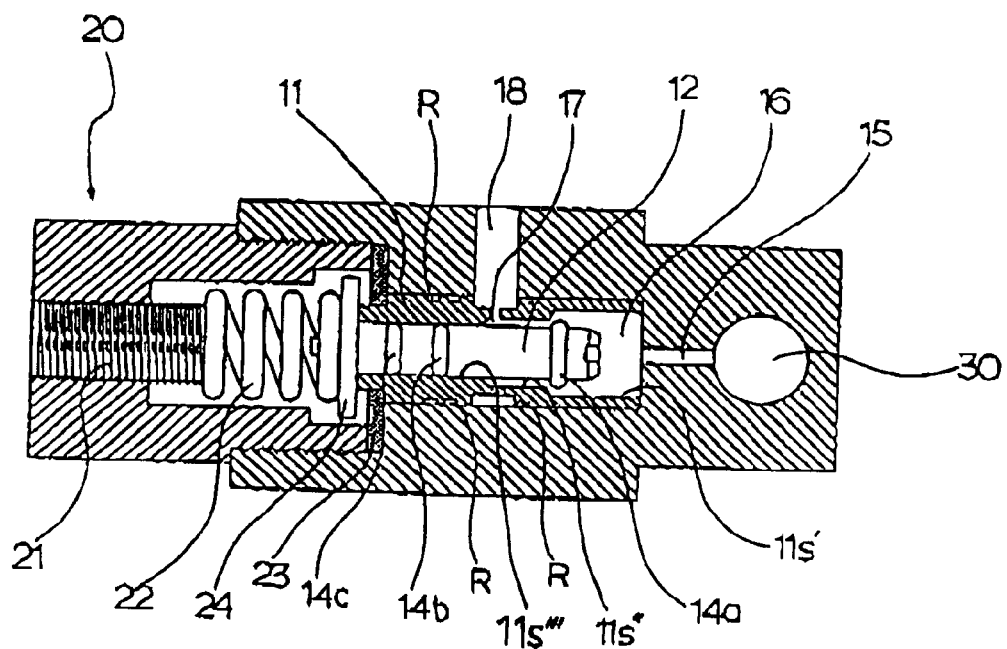

[FIG 3a]
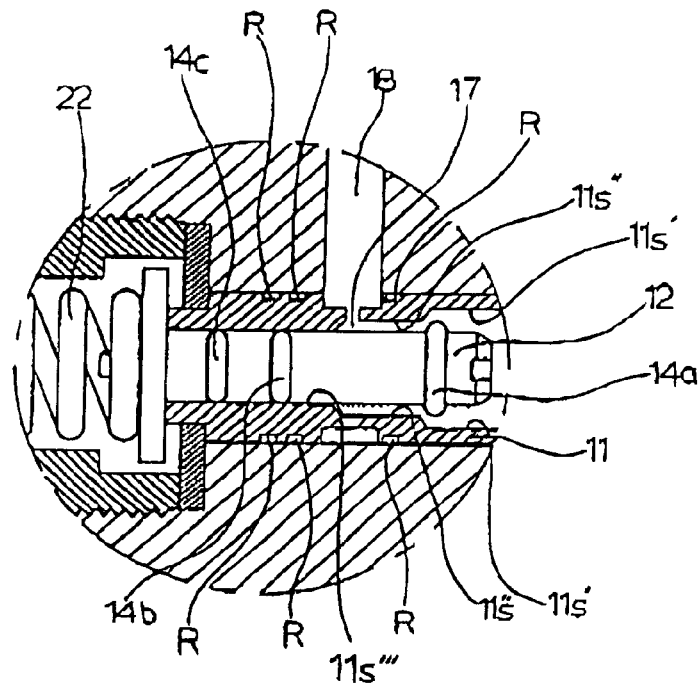
[FIG 3b]
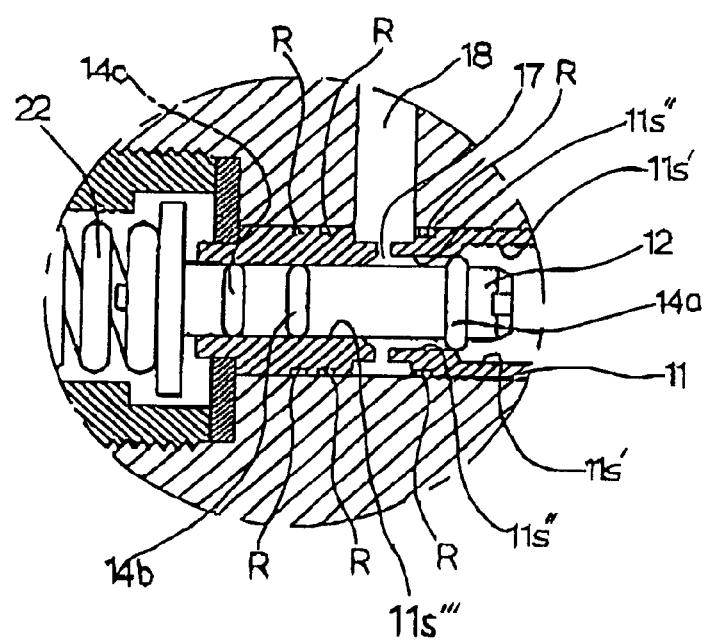

[FIG 4]
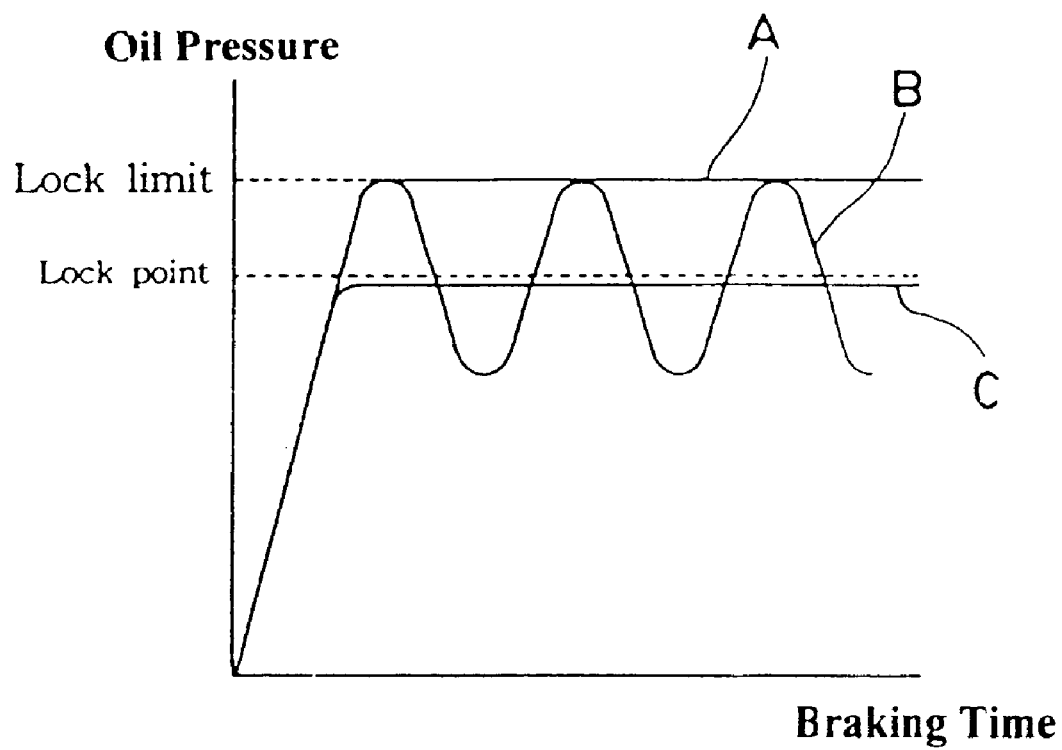

MECHANICAL OIL PRESSURE CONTROL APPARATUS FOR ANTILOCK BRAKE SYSTEM

BACKGROUND OF THE INVENTION

1. Field of the Invention

The present invention relates to a mechanical oil pressure control apparatus for an antilock brake system applied to vehicles.

2. Description of the Prior Art

Car accidents are mainly caused by over-speed and inefficient braking. Even in the running of a vehicle at a normal speed, an increase in the occurrence of accidents may occur under the condition in which the braking distance of the vehicle increases. In particular, when a vehicle is braked on a snowy or rainy road, its center of gravity may be laterally shifted, thereby causing the vehicle to be rotated. Thus, the steering function of the vehicle may be lost. In such a case, a terrible accident may occur.

In order to solve such a problem, antilock brake systems have conventionally been used. Such antilock brake systems are configured to repeatedly conduct a braking operation and a brake releasing operation within a short period of time when a brake pedal is depressed, thereby reducing a vehicle rotation phenomenon caused by a lateral shift of the vehicle's gravity center while reducing the braking distance. However, all known antilock brake systems are insufficient to reduce the vehicle rotation phenomenon and the braking distance to a desired range. Furthermore, in known antilock brake systems, vibrations is transmitted to the brake pedal during the procedure of repeatedly conduct a braking operation and a brake releasing operation, thereby causing the driver to be confused. In particular, conventional antilock brake systems cannot be applied to a motorcycle having two wheels because it cannot exhibit its antilock braking effect in that the motorcycle has structural characteristics causing the motorcycle to easily lose its balance even by a slip occurring for a very short period of time.

As a result of experiments, the inventor found that a maximum braking effect is obtained when the wheels of a vehicle are braked while conducting a rolling friction against the ground in the vicinity of the point of time corresponding to a brake lock point, without conducting a slipping friction against the ground, that is, at a slippage rate of less than 0.2. In accordance with this principle, the inventor has made a technique for maintaining the hydraulic pressure, applied to the brake device when the driver depresses the brake pedal or pulls the brake lever, to a level in the vicinity of a brake lock point calculated taking into consideration the weight and average running speed of the vehicle.

SUMMARY OF THE INVENTION

Therefore, an object of the invention is to provide a mechanical oil pressure control apparatus for an antilock brake system of a vehicle capable of minimizing the braking distance of the vehicle while maintaining a stable steering function and exhibiting a rapid response of oil pressure to a braking operation, thereby achieving an improved stable braking effect while preventing vibrations from being transmitted to a brake pedal of the vehicle and preventing the steering function from being lost due to a lateral shift of the vehicle's gravity center when the vehicle is braked while running on a snowy or rainy road.

In accordance with the present invention, this object is accomplished by providing a mechanical oil pressure control apparatus for an antilock brake system of a vehicle arranged between a master cylinder and a wheel cylinder both included in the antilock brake system and adapted to control an oil pressure transmitted from the master cylinder to the wheel cylinder comprising: a first body defined with a recess therein, the first body also having an oil inlet passage communicating with the master cylinder and an oil outlet passage communicating with the wheel cylinder; a hollow second body threadedly coupled to a front end of the first body; a cylinder member sealably inserted into the recess of the first body to define an oil chamber communicating with the oil inlet and outlet passages of the first body; a piston slidably fitted in the cylinder member while being subjected to an oil pressure supplied from the master cylinder and exerted in the oil chamber in such a fashion that a front end thereof slides axially in the oil chamber between a front position where the oil chamber is allowed to communicate with both the oil inlet and outlet passages and a rear position where the communication of the oil chamber with the oil outlet passage is cut off; and means for always urging the piston to move toward the front position against the oil pressure exerted in the oil chamber, the urging force of the urging means being adjusted in such a fashion that the oil pressure established at the point of time when the piston reaches the rear position substantially corresponds to a brake lock point of the antilock brake system.

BRIEF DESCRIPTION OF THE DRAWINGS

Other objects and aspects of the invention will become apparent from the following description of embodiments with reference to the accompanying drawings in which:

FIG. 1 is a partially-broken perspective view illustrating a mechanical oil pressure control apparatus for an antilock brake system according to the present invention;

FIG. 2 is a cross-sectional view illustrating the mechanical oil pressure control apparatus of FIG. 1;

FIG. 3a is a cross-sectional view of a part of the mechanical oil pressure control apparatus in an initial pressurized state obtained in accordance with a braking operation;

FIG. 3b is a cross-sectional view of a part of the mechanical oil pressure control apparatus in a maximum pressurized state obtained in accordance with the braking operation; and FIG. 4 is a graph illustrating the relationship between the oil pressure and the braking time in each of various brake systems.

DESCRIPTION OF THE PREFERRED EMBODIMENTS

In accordance with a preferred embodiment, the present invention provides a mechanical oil pressure control apparatus for an antilock brake system included in a vehicle, which apparatus is mounted between a master cylinder and a wheel cylinder both in the antilock brake system and adapted to control the oil pressure generated from the master cylinder to correspond to a desired oil pressure required at the point of time just before a skid occurs in a sudden braking operation.

Now, the mechanical oil pressure control apparatus according to the preferred embodiment of the present invention will be described with reference to the annexed drawings.

As shown in FIGS. 1 and 2, the mechanical oil pressure control apparatus includes a first body 10, and a second body 20 threadedly coupled to a rear end of the first body 10.

The first body 10 is provided at its portion near its front end with an oil inlet passage 30 communicating with an oil pressure supply line extending from the master cylinder. The oil inlet passage 30 extends across the axis of the first body 10. A threaded hole is formed at the rear end of the first body 10 in order to allow the second body 20 to be threadedly coupled to the first body 10. A recess is also provided at the first body 10 in such a fashion that it extends axially from the front end of the threaded hole toward the oil inlet passage 30. A cylinder member 11 is sealably inserted into the recess of the first body 10 to define an oil chamber 16. The oil chamber 16 defined by the cylinder member 11 in the first body 10 is communicated with the oil inlet passage 30 by an axial oil passage 15 formed in the first body 10. The cylinder member 11 is protruded from the recess at its rear end. A stopper 23 is fitted around the protruded rear end of the cylinder member 11 in order to prevent the cylinder member 11 from being separated from the recess. A cylindrical piston 12 is slidably fitted in the cylinder member 11 in such a fashion that its front end slides axially in the oil chamber 16. The cylindrical piston 12 is protruded from the cylinder member 11 at its rear end. A washer 24 is mounted to the protruded rear end of the cylindrical piston 12.

The seal between the recess and the cylinder member 11 in the first body 10 is maintained by a plurality of O-rings R fitted around the cylinder member 11. In order to fit the O-rings R, the cylinder member 11 is provided at its circumferential surface with a plurality of uniformly spaced annular grooves. The cylinder member 11 has a stepped cylindrical inner surface increasing in diameter in a stepped fashion as it extends toward the front end of the cylindrical member 11. That is, the cylinder member 11 has three cylindrical inner surface portions of different diameters, that is, an front inner surface portion 11s' having a largest diameter, an intermediate inner surface portion 11s" having a diameter smaller than that of the front inner surface portion 11s', and a rear inner surface portion 11s''' having a smallest diameter. The rear inner surface portion 11s''' of the cylinder member 11 has a diameter substantially identical to that of the piston 12 in order to allow the piston 12 to be sealably fitted in the cylinder member 11 at that portion 11s'''.

A packing member 14a is fitted around the piston 12 near the front end of the piston 12. As the piston 12 slides rearwardly along the cylindrical member 11, the packing member 14a comes into contact with a step defined between the front inner surface portion 11s' and the intermediate inner surface portion 11s", thereby preventing the piston 12 from further sliding rearwardly. Accordingly, the stroke of the piston 12 is limited between a front position where the washer 24 comes into contact with the protruded rear end of the cylindrical member 11 and a rear position where the packing member 14a comes into contact with the step defined between the front and intermediate inner surface portion 11s' and 11s" of the cylindrical member 11.

In order to maintain the seal between the cylinder member 11 and the piston 12 at the rear inner surface portion 11s''' of the cylinder member 11 during a slide movement of the piston 12, a pair of spaced packing members 14b and 14c are fitted around the piston 12 at the rear portion of the piston 12. The arrangement of the packing members 14b and 14c is determined in such a fashion that the packing members 14b and 14c are in contact with the rear inner surface portion 11s''' of the cylinder member 11 during the slide movement of the piston 12 between the front and rear positions.

The cylinder member 11 is also provided with an oil outlet 17 at a portion thereof corresponding to the intermediate inner surface portion 11s". In the illustrated case, the oil outlet 17 is formed at a portion of the cylinder member 11 near a step defined between the intermediate and rear inner surface portions 11s" and 11s'''. The oil outlet 17 always communicates with an oil outlet passage 18 formed in a radial direction at the first body 10 and adapted to communicate with the wheel cylinder. At the rear position of the piston 12, the oil outlet 17 is closed by the packing member 14a. Otherwise, the oil outlet 17 is open to communicate the oil chamber 16 with the oil outlet passage 18, thereby allowing a pressurized oil existing in the oil chamber 16 to be supplied to the wheel cylinder via the oil outlet 17 and oil outlet passage 18.

The second body 20 is provided at its front portion with a spring receiving recess and at its rear portion with a threaded hole communicating with the spring receiving recess. A compression coil spring 22 is received in the spring receiving recess of the second body 20 whereas a spring force adjusting bolt 21 is threadedly fitted in the threaded hole of the second body 20. In a state in which the second body 20 is threadedly coupled to the first body 10, the compression coil spring 22 is interposed between the front end of the spring force adjusting bolt 21 and the bushing 24 mounted to the rear end of the cylindrical piston 12, so that it always urges the piston 12 toward its front position. The spring force adjusting bolt 21 serves to adjust the spring force of the compression coil spring 22 applied to the piston 12.

Referring to FIG. 3a, the mechanical oil pressure control apparatus having the above mentioned configuration according to the present invention is in a state in which no braking operation is conducted. In this state, the piston 12 is positioned at its front position at which the washer 24 comes into contact with the protruded rear end of the cylindrical member 11 by virtue of the spring force of the compression coil spring 22. At the front position of the piston 12, the packing 14a is spaced away from the step defined between the front and the intermediate inner surface portion 11s' and 11s", thereby allowing the oil chamber 16 to communicate with the oil outlet passage 18 via the oil outlet 17. When the brake pedal (not shown) is depressed or when the brake lever (not shown) is pulled, pressurized oil is introduced from the master cylinder into the oil chamber 16 via the oil inlet passage 30 and the axial passage 15. The pressurized oil introduced in the oil chamber 16 is discharged into the oil outlet passage 18 via the oil outlet 17 while urging the piston 12 to move toward its rear position against the spring force of the compression coil spring 22. The pressurized oil discharged from the oil chamber 16 is fed to the wheel cylinder via the oil outlet passage 18, so that it serves to generate a braking force. As the brake pedal is further depressed or as the brake lever is further pulled, the pressure of the pressurized oil introduced in the oil chamber 16 is increased, thereby causing the piston 12 to further move toward its rear position against the spring force of the compression coil spring 22. Consequently, the rear movement of the piston 12 is stopped at a position where the oil pressure applied to the piston 12 is balanced with the spring force of compression coil spring 22 applied to the piston 12. The spring force of the compression coil spring 22 applied to the piston 12 is adjusted in such a fashion that the packing 14a mounted to the piston 12 comes into contact with the step defined between the front and intermediate inner surface portion 11s' and 11s" at the point of time when the oil pressure in the oil chamber 16 reached a level approximate to a brake lock point of the antilock brake system. The oil outlet 17 is cut off when the packing 14a comes into contact with the step defined between the front and intermediate inner surface portion 11s' and 11s" in accordance with the rearward movement of the piston 12, that is, when the piston 12 reached its rear position, as shown in FIG. 3b. In this state, there is no increase in the oil pressure in the wheel cylinder even when the brake pedal is further depressed or when the brake lever is further pulled. This is because no pressurized oil is further supplied to the wheel cylinder.

The adjustment of the spring force can be achieved by appropriately adjusting the compressed extent of the compression coil spring 22 in accordance with a fastening or releasing of the spring force adjusting bolt 21. The compressed extent of the compression coil spring 22 is appropriately determined, taking into consideration the average running speed and weight of the vehicle. As mentioned above, an appropriate spring force of the compression coil spring 22 corresponds to an oil pressure in the oil chamber 16 approximate to the brake lock point of the antilock brake system.

As apparent from the above description, the mechanical oil pressure control apparatus is configured to stop an increase in oil pressure, occurring as the brake pedal is depressed or when the brake lever is pulled, at the point of time when the oil pressure reaches a level approximate to the brake lock point of the antilock brake system. Since the wheels of the vehicle rotates at an appropriate speed without being slipped. Accordingly, it is possible to minimize a rotation and slippage of the vehicle occurring due to a lateral shift of the vehicle's gravity during a braking operation, as compared to conventional brake systems or antilock brake systems.

FIG. 4 is a graph illustrating the relationship between the oil pressure and the braking time in each of the general brake system A, the conventional antilock brake system B, and the brake system C according to the present invention.

Referring to FIG. 4, it can be found that in the case of the general brake system A, an excessive oil pressure is generated which serves to generate a continued slippage of the wheels after the rotation of those wheels is stopped. In the case of the conventional antilock brake system B, it is possible to more or less reduce the braking distance while more or less reducing the rotation of the vehicle because the wheels are rotated during an instantaneous reduction of oil pressure while being slipped by an excessive oil pressure generated during a braking operation. In the case of the brake system C of the present invention, however, a minimized rotation of the wheels is generated during the braking operation. Accordingly, it is possible to obtained an improved braking effect, as compared to the conventional cases involving a slippage of the wheels. It is also possible to minimize the rotation of the vehicle occurring due to a lateral shift of the vehicle's gravity center.

In accordance with the present invention, the vehicle is decelerated in an optimum state by virtue of a controlled braking pressure generated when the brake pedal is depressed or when the brake lever is pulled. Moreover, there is no vibration applied to the brake pedal or brake lever, as compared to the conventional antilock brake system. Accordingly, the driver can conduct a stable braking manipulation with a reduced force applied to the brake pedal or brake lever and without any confusion.

In order to evaluate the braking effect obtained by the mechanical oil pressure control apparatus for antilock brake systems according to the present invention, as compared to that of the conventional antilock brake system, an experiment was made using motorcycles respectively equipped with those of the present invention and conventional case. As a result of the experiment, it could be found that the apparatus of the present invention exhibits a braking distance reduced by 15 to 40% from that of the conventional case with a reduced braking force applied to the brake pedal or brake lever while allowing the motorcycle to maintain a stable steering function when a sudden braking operation is carried out at a running speed of 70 to 120 km/hour.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A mechanical oil pressure control apparatus for an antilock brake system of a vehicle arranged between a master cylinder and a wheel cylinder both included in the antilock brake system and adapted to control an oil pressure transmitted from the master cylinder to the wheel cylinder comprising:

a first body defined with a recess therein, the first body also having an oil inlet passage communicating with the master cylinder and an oil outlet passage communicating with the wheel cylinder;

a hollow second body threadedly coupled to a front end of the first body;

a cylinder member sealably inserted into the recess of the first body to define an oil chamber communicating with the oil inlet and outlet passages of the first body;

a piston slidably fitted in the cylinder member while being subjected to an oil pressure supplied from the master cylinder and exerted in the oil chamber in such a fashion that a font end thereof slides axially in the oil chamber between a front position where the oil chamber is allowed to communicate with both the oil inlet and outlet passages and a rear position where the communication of the oil chamber with the oil outlet passage is cut off, wherein the cylinder member has a stepped cylindrical inner surface increasing in diameter in a stepped fashion as it extends toward a front end of the cylindrical member, the stepped cylindrical inner surface having a front inner surface portion having a largest diameter, an intermediate inner surface portion having a diameter smaller than that of the front inner surface portion, and a rear inner surface portion having a smallest diameter, the rear inner surface portion of the cylinder member having a diameter substantially identical to that of the piston to allow the piston to be sealably fitted in the cylinder member at the rear inner surface portion; and means for always urging the piston to move toward the front position against the oil pressure exerted in the oil chamber, the urging force of the urging means being adjusted in such a fashion that the oil pressure established at the point of time when the piston reaches the rear position substantially corresponds to a brake lock point of the antilock brake system.

2. The mechanical oil pressure control apparatus according to claim 1, further comprising:

a packing member fitted around the piston and adapted to come into contact with a step defined between the front and intermediate inner surface portions of the cylinder member when the piston reaches the rear position, thereby stopping the piston at the rear position while cutting off the communication of the oil chamber with the oil outlet passage.

3. The mechanical oil pressure control apparatus according to claim 2, wherein the cylinder member is provided, at a portion thereof corresponding to the intermediate inner surface portion, with an oil outlet communicating the oil chamber with the oil outlet passage.

4. The mechanical oil pressure control apparatus according to claim 1, wherein the urging means comprises:

a compression coil spring received in the second body and adapted to always urge the piston toward the front position against the oil pressure exerted in the oil chamber; and a spring force adjusting bolt threadedly fitted in the second body and adapted to adjust a spring force of the compression coil spring in accordance with a fastening or loosening operation thereof.

* * * * *